(No Model.)

G. M. BATES.
GATE.

No. 331,110. Patented Nov. 24, 1885.

WITNESSES.
G. P. Kramer.
R. W. Bishop.

INVENTOR.
George M. Bates
By R. S. & A. P. Lacey
ATTY.

UNITED STATES PATENT OFFICE.

GEORGE M. BATES, OF TIPTON, INDIANA.

GATE.

SPECIFICATION forming part of Letters Patent No. 331,110, dated November 24, 1885.

Application filed July 31, 1885. Serial No. 173,164. (No model.)

*To all whom it may concern:*

Be it known that I, GEORGE M. BATES, a citizen of the United States, residing at Tipton, in the county of Tipton and State of Indiana, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to farm-gates; and it consists in the peculiar construction and arrangement of the several parts, as hereinafter described, and specifically pointed out in the claims.

Figure 1:
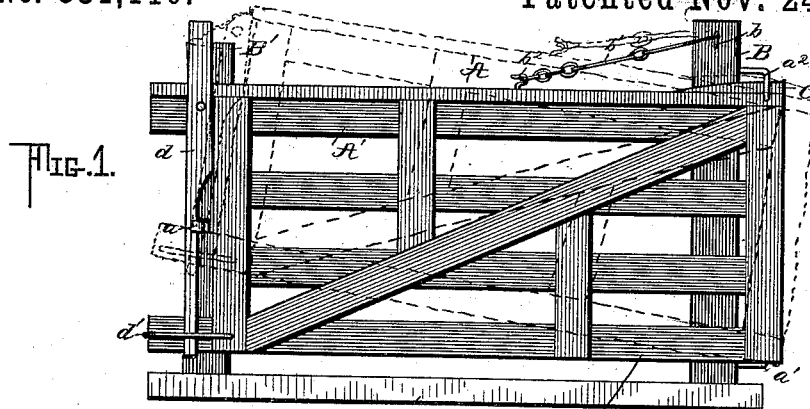
Figure 2:
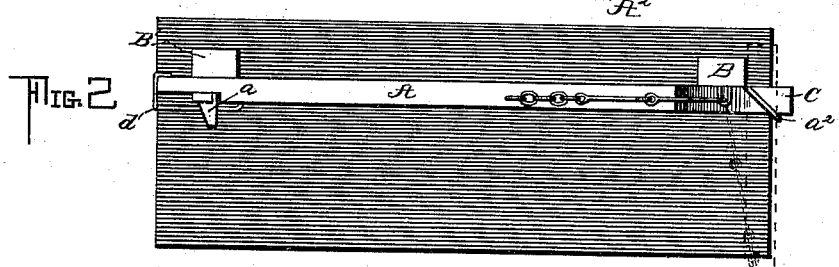
Figure 3:
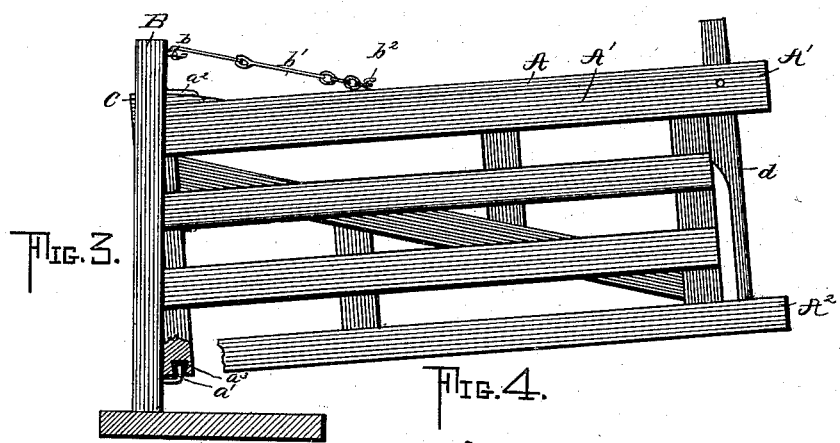
Figure 4:

Figure 1 is a side elevation of the gate closed. Fig. 2 is a top plan of the same with gate shown open in dotted lines. Fig. 3 is a side view of the gate open. Fig. 4 is a detail of the latch with modifications.

A is the gate. B B' are the two posts. The gate swings on the post B and closes against the post B'. The post B' is provided with a fixed latch, $a$, arranged and adapted to hold the latch hereinafter described. I have shown the posts as set on a wooden base or sill. This is done for convenience of illustration. The post can be set in the ground or fixed to a sill or framing, as may be desired. To the rear post, B, I fix a supporting-hook, $a'$, on which the rear end of the gate is pivoted, and near the top of the same post I fix the hook $a^2$, which catches over the top of the gate, as shown. The lower hook enters mortise $a^3$, which is round in cross-section, formed in the lower bar of the gate or in the lower end of the rear batten or just between the lower bar and the rear batten. This mortise increases gradually in diameter from its outer to its inner end, so that it permits the tilting of the gate, as hereinafter explained. The hooks $a'$ $a^2$ project at an angle of about five degrees from the face of the post, and are so arranged as to hold the gate when closed against the front face of the post, and when open hold it close to the rear side thereof. To the front face of the post, and near the middle or front edge thereof, I fix a staple, $b$, to which is attached one end of the chain $b'$, the other end of which is attached to a hook, $b^2$, on the top of the gate. The staple $b$ is arranged on a vertical line in advance of the line on which the lower hook, $a'$, is arranged. The purpose of this arrangement is to cause the front end of the gate to be lifted, as shown in Fig. 3, when it is swung open. It will automatically close when it is released.

The chain $b'$ is composed of a series of links, any one of which may be caught on the hook $b^2$. The front end of the gate may be raised and held to any suitable height, so as to permit small stock to pass under it while the larger stock are prevented from going through the gateway. When hooked up, as shown in dotted lines, Fig. 1, the gate will swing open or shut with the same readiness as when in the position shown in full lines.

On the rear end of the top bar of the gate I place an inclined bar, $c$, which is arranged just under the shank of the hook $a^2$. It gives a strong hold for the hook, and in nowise interferes with the raising or lowering of the gate.

The upper and lower bars, A' A², of the gate have their front ends projected past the post B', and to the top bar I pivot the latch $d$. The lower end of the latch is held in proper place by a small rod or keeper, $d'$. The latch is so pivoted that it drops automatically over the catch $a$ when the gate closes against the post B'. The latch may, if desired, be provided with teeth $d^2$ $d^3$ on its edge, which will engage the catch. The tooth $d^3$ will engage on the under face of the catch, and will prevent the raising of the gate by pigs or other small stock seeking to crawl below the lower bar. A². The teeth $d^2$ will serve a temporary purpose to hold the gate in the position shown in dotted lines in Fig. 1, thereby obviating the necessity of changing the links on the chain $b'$.

In operation the gate swings to the rear of the rear post, as shown in dotted lines, Fig. 2. When in this position, the chain $b'$ is at an angle to the position of the gate, and causes the gate to close more readily. The front end being elevated and the chain drawing at an angle, as shown, the gate will swing readily around against the post B'.

Having thus described my invention, what I claim, and desire to secure by Letters Patent, is—

1. The combination of the post B, provided with the hooks $a'$ $a^2$, projecting rearward and at an angle to the front face thereof, the staple or hook $b$ in the post B, above the gate and on a vertical line in advance of the hooks $a'$ $a^2$, the chain $b'$, attached to the hook $a^2$ or staple $b$ and the top of the gate, the gate pivoted on the lower hook and resting between the upper hook, $a^2$, and the post, substantially as and for the purposes set forth.

2. The combination, with the gate supported by and tilting upon the hook $a'$ and held by the hook $a^2$ on the rear post, of the latch $d$, pivoted at its upper end to the front end of the gate, and the catch $a$, secured on the front post, substantially as and for the purposes set forth.

In testimony whereof I affix my signature in presence of two witnesses.

GEORGE M. BATES.

Witnesses:
ORI SNYDER,
JAMES L. SMOLLEY.